May 30, 1950      G. A. REYNOLDS, JR      2,509,526
TRANSMISSION ARRANGEMENT FOR CLOSELY SPACED WHEELS
Filed Jan. 27, 1947      3 Sheets-Sheet 1
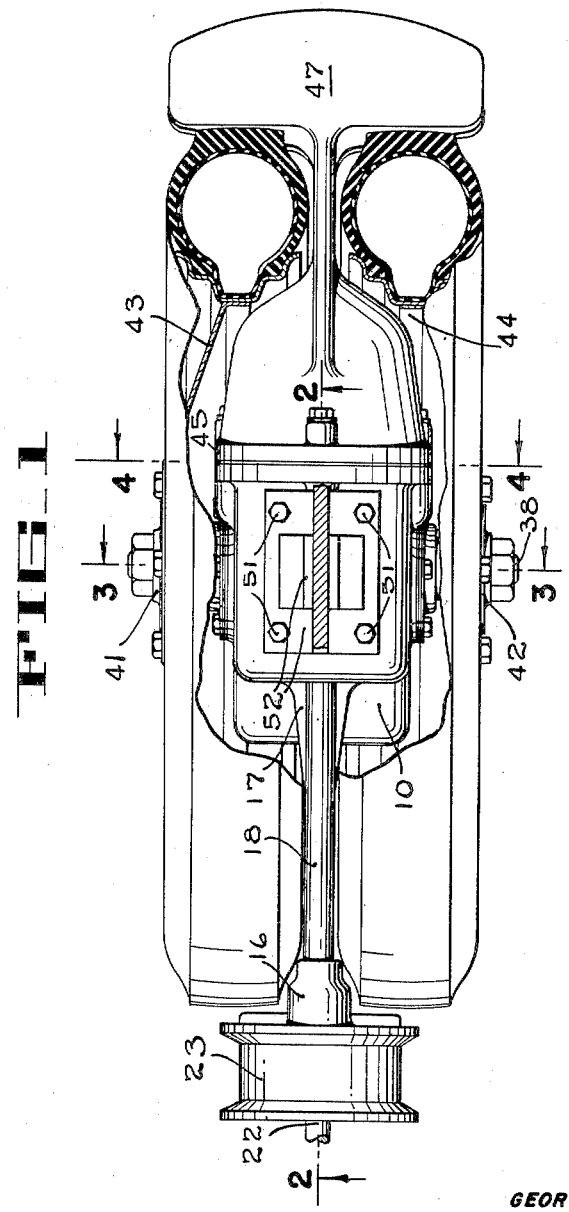
INVENTOR
GEORGE A. REYNOLDS JR.
BY Philip A. Minnis
Hans G. Hoffmeister
ATTORNEYS May 30, 1950 G. A. REYNOLDS, JR 2,509,526
TRANSMISSION ARRANGEMENT FOR CLOSELY SPACED WHEELS
Filed Jan. 27, 1947 3 Sheets-Sheet 2
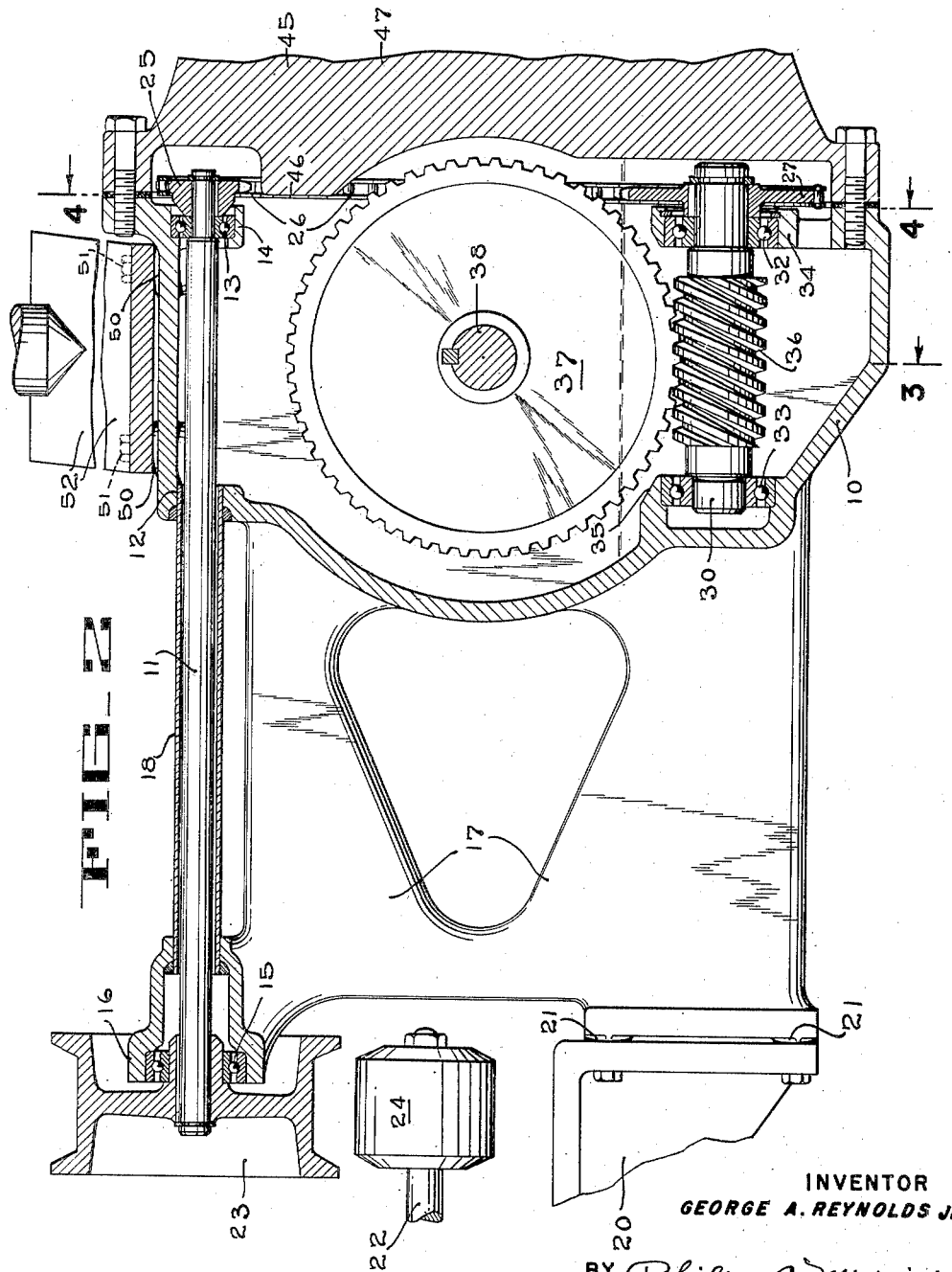
INVENTOR
GEORGE A. REYNOLDS JR.
BY Philip A. Minnis.
Hans G. Hoffmeister.
ATTORNEYS

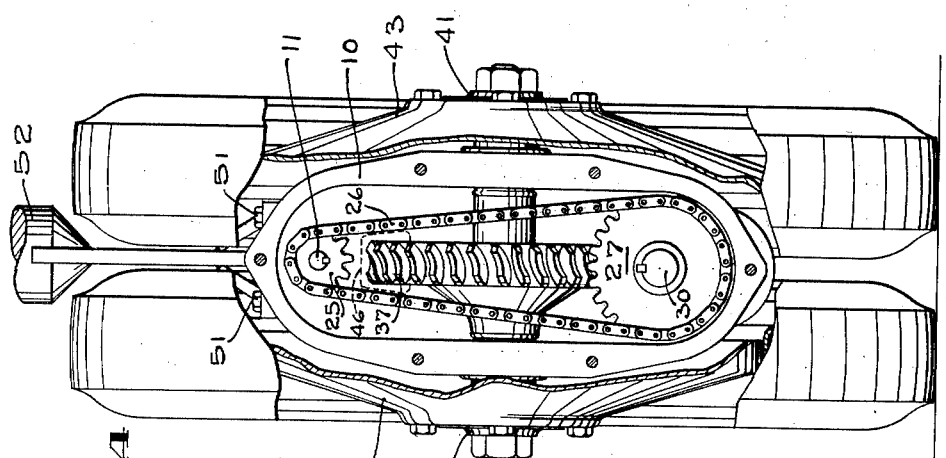
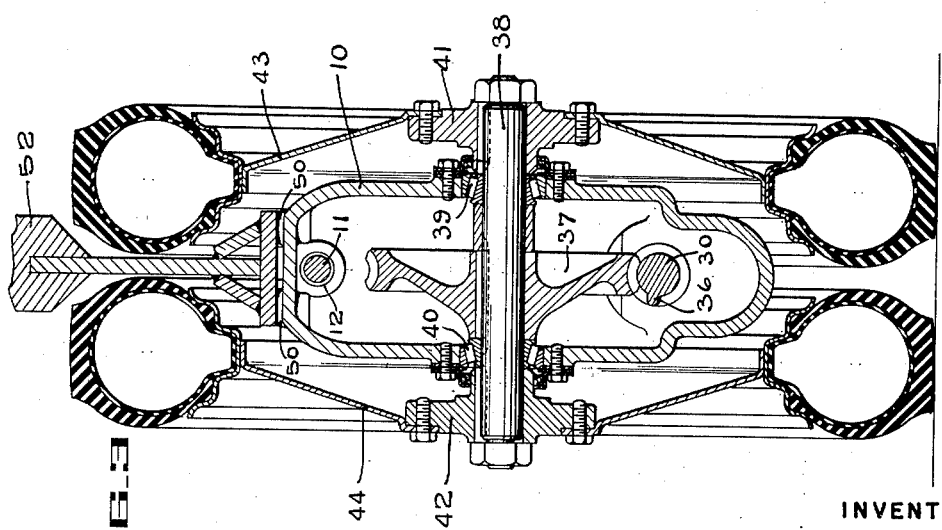

Patented May 30, 1950

2,509,526

UNITED STATES PATENT OFFICE 2,509,526

TRANSMISSION ARRANGEMENT FOR CLOSELY SPACED WHEELS

George A. Reynolds, Jr., San Jose, Calif., assignor to Food Machinery and Chemical Corporation, a corporation of Delaware Application January 27, 1947, Serial No. 724,507

5 Claims. (Cl. 180—11)

The present invention relates to transmission arrangements adapted to deliver the power of a drive or propeller shaft to a driven shaft disposed in angular relation thereto.

The present invention aims to provide a system of this type wherein the transmission of power from a drive or propeller shaft to an angularly disposed driven shaft is accomplished within a minimum of compass laterally of the drive shaft.

It is, therefore, an object of the present invention to provide a transmission system of the type referred to which is efficient in operation and compact in construction.

Another object is to provide a transmission arrangement adapted to deliver the power of a drive or propeller shaft to a transversely disposed axle within a minimum of space transversely of the propeller shaft.

Another object is to provide a transmission system of the type referred to, especially for automotive vehicles, which permits the traction wheels to be positioned closely adjacent to the propeller shaft.

Another object is to provide a transmission arrangement of the type referred to, which permits close mounting of the traction wheels axially thereof as to render differential gearing unnecessary.

Another object is to provide a transmission arrangement of the type referred to, especially for the actuation of the traction wheels of agricultural vehicles, which permits these traction wheels to be mounted at either side of the propeller shaft in closely spaced relation while providing for the propeller shaft to be positioned at any altitude relative to the wheels as may be required to furnish adequate ground clearance for operation over rugged fields, brushland, and the like.

Another object of the present invention is to provide a transmission system of the type referred wherein adequate and automatic lubrication of all its moving parts in spite of its narrow and predominantly vertical compass is assured.

Other and further objects of the present invention will be apparent from the following description and drawings in which:

Figure 1 is a partial plan view of a tractor transmission embodying the present invention.

Figure 2 is a longitudinal section through the transmission casing taken along line 2—2 of Figure 1.

Figure 3 is a cross-section of Figure 1 taken along lines 3—3 thereof.

Figure 4 is a rear view of Figure 1 taken along line 4—4 thereof showing the transmission casing with the cover plate removed to expose the interior thereof; certain parts being broken away.

In the embodiment illustrated in the drawing, the transmission structure of my invention is enclosed in a protective casing 10 of cast iron or any other suitable material. A horizontally disposed drive or propeller shaft 11 extends into the casing 10 through a suitable opening 12 at the upper end thereof, as shown in Figure 2. The interior portion of the drive shaft 11 is rotatably supported in a suitable bearing 13 located in a seat or bushing 14 which may be formed as an integral part of the casing 10. The exterior portion of the drive shaft 11 is rotatably supported in a suitable bearing 15 seated in a bushing 16 which may be formed in a supporting web 17 integral with and projecting forwardly from casing 10. A protective sleeve or jacket 18 may be provided around the exposed portion of drive shaft 11, as shown in Figure 2, to prevent dirt and moisture from entering the transmission casing 10 or the bushing 16.

The propeller shaft may be operated from any suitable source of power such as an internal combustion engine (not shown) supported on a bracket 20 secured to mounting pads 21 formed in the front end of the web 17, as shown in Figure 2. Any suitable clutch arrangement may be employed to transmit the power delivered by the engine to the drive or propeller shaft 11 when needed. In applying the invention to tractors provided with closely spaced traction wheels as illustrated herein, I prefer a simple arrangement of the type indicated diagrammatically in Figure 2 wherein the propeller shaft 11 and a power shaft 22 of the engine are each provided with pulleys 23 and 23, respectively, with an endless drive belt (not shown) being trained loosely around both of said pulleys. The vertical position of the engine and hence of power shaft 22 and pulley 24 is arranged to be adjustable relative to the pulley 23 on the propeller shaft 11. Thus, when the pulley 24 is set to its remote position relative to the pulley 23, the drive belt is tensioned and the pulley 24 will rotate the pulley 23 by means of the belt and the propeller shaft 11 in one of its directions of operation. On the other hand, when the pulley 24 is set to a position wherein its beveled circumference (Figure 2) frictionally engages the sloping insides of the circumferential flanges of the pulley 23, it will drive the pulley 23 and hence the propeller shaft 11 in an opposite direction of operation. It will be understood that when the pulley 24 is set to an intermediate position wherein the circumferential areas of the two pulleys are out of contact, and the belt is still in relaxed condition, the propeller shaft 11 and hence the tractor will be in a state of rest. Care should be taken to provide the power coupling arrangement described an adequate distance ahead of the transmission arrangement proper so as to preclude any interference between the pulleys 23 and 24 and the tractor tires, as indicated in Figure 1.

Keyed upon the interior end of the propeller shaft 11 is a small sprocket 25, as more clearly shown in Figure 4. A sprocket chain 26 operatively connects the sprocket 25 with another sprocket 27 keyed upon a horizontally disposed stub shaft 30 mounted in parallel relation to propeller shaft 11 within the casing 10 near the bottom thereof. Stub shaft 30 is journalled in two bearings 32 and 33 seated in suitable bushings 34 and 35, respectively, which are formed in the lower portion of the transmission casing 10, as shown in Figure 2. The stub shaft 30 is provided with a worm 36 that meshes with a worm gear 37 disposed between, and substantially within the vertical plane determined by shafts 11 and 30, and keyed upon a transverse axle 38, as may best be seen from Figure 3. The axle 38 is journalled in suitable bearings 39 and 40 provided in the side walls of the transmission casing 10 and hubs 41 and 42 for traction wheels 43 and 44, respectively, (Figure 1) are keyed upon the exteriorly projecting ends of the axle 38 on either side of the transmission casing 10.

In the arrangement described, rotational movement of the propeller shaft 11 is transmitted to the worm 36, firmly mounted on stub shaft 30, through the sprocket 25, the sprocket chain 26 and the sprocket 27 keyed to stub shaft 30. The worm 36 in turn rotates the worm gear 37 in a plane parallel to the axis of rotation of the propeller shaft 11, and the worm gear 37 turns the axle 38 and hence the traction wheels 43 and 44. The structure resulting from the arrangement described is exceedingly compact in transverse direction and requires no more space laterally of drive shaft 11 than is taken up by the small sprockets 25 and 27. As a result thereof the traction wheels of the vehicle may be mounted in closely spaced relation, i. e., as close as the diameter of the propeller shaft and the necessary clearance between said shaft and the tires of the traction wheels will permit. Furthermore, the propeller shaft may be positioned as high above the bottom level of the traction wheels as the vehicle's intended purpose of use may require.

It will be noted that in the embodiment illustrated in the drawing the lower sprocket 27 is of a somewhat larger diameter than the upper sprocket 25 (Figure 4) in order to reduce the speed applied to the propeller shaft 11 by the engine and to increase the traction ultimately imparted to the wheels. Thus, a mechanism wherein the diameters of the sprockets 25, 27 and of the worm gear 37 are related in the manner illustrated in the drawing, is capable of a speed reduction, for instance, from 2000 R. P. M. for the propeller shaft to approximately 35 R. P. M. for the traction wheels. It will be understood that the lower sprocket 27 may also be made of as small a diameter as the upper one, should it be desirable to decrease the transverse dimension of the transmission structure still further, and required reductions in speed may be obtained by appropriate increases in the diameter of the worm gear 37. Since this worm gear may be arranged to protrude into, and operate between the vertical runs of the sprocket chain 26, as shown in Figure 2, it has a relatively wide margin as to its size.

Means are provided in accordance with the present invention to prevent any fouling of the sprocket chain 26 with the worm gear 37 in spite of their propinquity. To this end the detachable cover plate 45 at the rear of the transmission casing 10 may be provided with an inwardly extending lug or boss 46 projecting between the vertical runs of the sprocket chain 26 at any suitable place above (or below) the interjacent segment of the worm gear, as shown in Figures 2 and 4. The boss 46 is preferably of such width transversely of the transmission casing, to be barely clear of the vertical runs of the sprocket chain when the latter is in properly tensioned condition, in which case the boss will in no way interfere with the operation of the chain. However, as soon as the chain becomes loose due to wear or misadjustment, the boss 46 will act as a skid guide preventing such inward fluctuations of the vertical chain runs as may strike and entangle the worm gear 37.

The detachable cover plate 45 at the rear of the transmission casing 10 also serves to provide a counterweight for the engine which is mounted in front of the casing, as previously pointed out. For this purpose the cover plate has a rearwardly directed extension 47 which may be made of, or loaded with, heavy metal to increase its weight. The resultant increase in the over-all weight of the tractor structure has the added advantage of enhancing the traction of the vehicle. It should be noted that the rearward extension 47 of the cover plate 45 must be of suitable shape, such as shown in Figure 1, to permit unobstructed movement of the rear segments of the closely adjacent traction wheels 43 and 44.

Although the transmission structure described is of a predominantly two-dimensional character extending in vertical direction, its movable elements are arranged in such a manner that proper lubrication is insured without any need for additional structure. Due to the fact that the arrangement in accordance with the present invention provides for a low location of the worm 36 near the bottom of the transmission casing in spite of the operational necessity of positioning the power supply shaft 11 materially above ground level, the worm transmission may be made to operate completely immersed in a bath of lubricating oil by constructing the lower portion of the transmission casing in the form of a container, as shown in Figures 2, 3, and 4, and filling it with lubricating oil to a level well above worm 36, as indicated in Figure 2. As a result, not only the enmeshed portions of worm 36 and worm gear 37, but also the bearings 32 and 33 of the stub shaft 30 and most of sprocket wheel 27 are submerged in lubricating oil. Moreover, the splashing of oil caused by the relatively swift operation of the sprocket chain 26 as it dips into, and emerges from the oil bath, is instrumental in dissipating the heat which the oil bath absorbs from the worm transmission so that the harmful tendency of worm gearings to become overheated is effectively counteracted. Since the oil also splashes into the upper portion of the transmission casing and since a certain amount of oil is entrained in, and taken along, by the upward run of the sprocket chain, adequate lubrication of the axle bearings 39 and 40, upper sprocket 25, and of the inner bearing 13 of the propeller shaft is likewise insured.

The top of the transmission casing may be provided with four mounting pads 50, as shown in Figures 1 and 2, which are drilled and tapped to receive the mounting bolts 51 of a trunnion member 52. Trunnion member 52 is adapted to pivotally connect the described traction assembly to the main frame of the vehicle and form part of the steering device thereof (not shown). It should be noted that the location of the mounting pads 50 is such that the trunnion 52 is positioned on a substantially vertical axis disposed at substantially right angles to the shafts 11 and 30 and the transverse axle 38 of the traction wheels directly above the lowermost points of said wheels (not shown) to assure maximum maneuverability within a minimum of steering effort.

While I have described a particular embodiment of the present invention, it will be understood that various changes and modifications may be made without departing from the spirit of the present invention and the scope of the appended claims.

Having thus described my invention, what I claim as new and desire to protect by Letters Patent is:

1. A transmission arrangement including a horizontally disposed first shaft, a first sprocket mounted on said first shaft for rotation therewith, a second shaft disposed below said first shaft in parallel spaced relation thereto, a second sprocket mounted on said second shaft for rotation therewith and in vertical alignment with said first sprocket, a sprocket chain operatively connecting said sprockets and having descending and ascending runs, a worm firmly mounted on said second shaft, a third shaft rotatably disposed transversely to and between said first and second shafts, a worm gear firmly mounted on said third shaft substantially within the plane determined by said first and second shafts and intervening between the runs of said sprocket chain, and spacer means disposed between the vertical runs of said sprocket chain to prevent interference between said chain and said worm gear.

2. A transmission structure for tractors, including a transmission casing having a cover plate rearwards thereof, a horizontally disposed drive shaft protruding into and rotatably mounted within the upper portion of said casing, a first sprocket mounted on said drive shaft for rotation therewith, a second shaft rotatably mounted within the lower portion of said casing in spaced parallel relation to said drive shaft, a second sprocket mounted on said second shaft for rotation therewith and in vertical alignment with said first sprocket, a sprocket chain operatively connecting said sprockets and having an ascending and a descending run, an axle rotatably mounted in said casing transversely to and between said shafts, a worm mounted on said second shaft, a worm gear mounted on said axle in mesh with said worm and intervening between the runs of said sprocket chain, and a skid guide supported from said coverplate and extending between said vertical sprocket chain runs.

3. A tractor assembly including a horizontally disposed axle, a pair of adjacently juxtaposed traction wheels firmly mounted upon said axle, a horizontally disposed drive shaft extending chordally of and between said wheels above and at right angles to said axle, and a transmision arrangement wholly confined within the space between said wheels for transmitting power from said drive shaft to said axle comprising a first sprocket firmly mounted upon said drive shaft, a second shaft rotatably mounted intermediately of said wheels below said axle and in parallel relation to said drive shaft, a second sprocket firmly mounted upon said second shaft in vertical alignment with said first sprocket, a sprocket chain operatively connecting said sprockets, a worm firmly mounted upon said second shaft and a worm gear in mesh with said worm firmly mounted upon said axle for rotation within the plane determined by said parallel shafts.

4. A tractor asembly including a transmission casing of limited transverse width, a horizontal axle extending transversely through said casing and rotatably supported in the flanks thereof, a pair of traction wheels firmly mounted upon the outwardly protruding ends of said axle at either side of and closely adjacent to the flanks of said casing, a horizontally disposed drive shaft protruding into said casing above and at right angles to said axle, a first sprocket firmly mounted upon said drive shaft within said casing, a second shaft rotatably mounted within said casing below said axle and in parallel relation to said drive shaft, a second sprocket firmly mounted upon said second shaft in vertical alignment with said first sprocket, a sprocket chain operatively connecting said sprockets, a worm firmly mounted upon said second shaft, a worm gear in mesh with said worm firmly mounted upon said axle for rotation within the plane determined by said parallel shafts and intervening between the vertical runs of said sprocket chain, and a spacer element disposed between and adapted to maintain the runs of said sprocket chain apart.

5. A tractor assembly comprising a transmission casing of limited transverse width having a front wall, a pair of side walls and a rearwardly positioned cover plate, means attached to said front wall for supporting an engine, a horizontally disposed drive shaft protruding through said front wall into the upper portion of said casing, a sprocket firmly mounted upon said drive shaft within said casing at a point near the cover plate thereof, a second shaft rotatably mounted within the lower portion of said casing in parallel relation to said drive shaft, a second sprocket mounted upon said second shaft in vertical alignment with said first sprocket, a sprocket chain operatively connecting said sprockets, a horizontal axle extending transversely between said shafts and through the sidewalls of said casing, traction wheels firmly mounted upon the protruding ends of said axle closely adjacent to the sidewalls of said casing, a worm firmly mounted upon said second shaft and a worm gear in mesh with said worm firmly mounted upon said axle and intervening between the vertical runs of said sprocket chain, said cover plate having an inwardly projecting boss extending between the runs of said sprocket chain and adapted to maintain said runs apart, and an outwardly directed projection extending between and beyond said wheels and adapted to support a counterweight outside the compass of said wheels.

GEORGE A. REYNOLDS, Jr.

REFERENCES CITED

The following references are of record in the file of this patent:

UNITED STATES PATENTS

| Number | Name | Date |
|---|---|---|
| 828,713 | Coffman et al. | Aug. 14, 1906 |
| 1,511,873 | Davison | Oct. 14, 1924 |
| 1,911,666 | Beitz | May 30, 1933 |
| 1,988,421 | McCann et al. | Jan. 15, 1935 |
| 2,336,386 | Beck | Dec. 7, 1943 |
| 2,398,498 | Funk | Apr. 16, 1946 |
| 2,406,230 | Lill | Aug. 20, 1946 |